(No Model.)
P. LORD.
HOSE COUPLING.
No. 248,658. Patented Oct. 25, 1881.
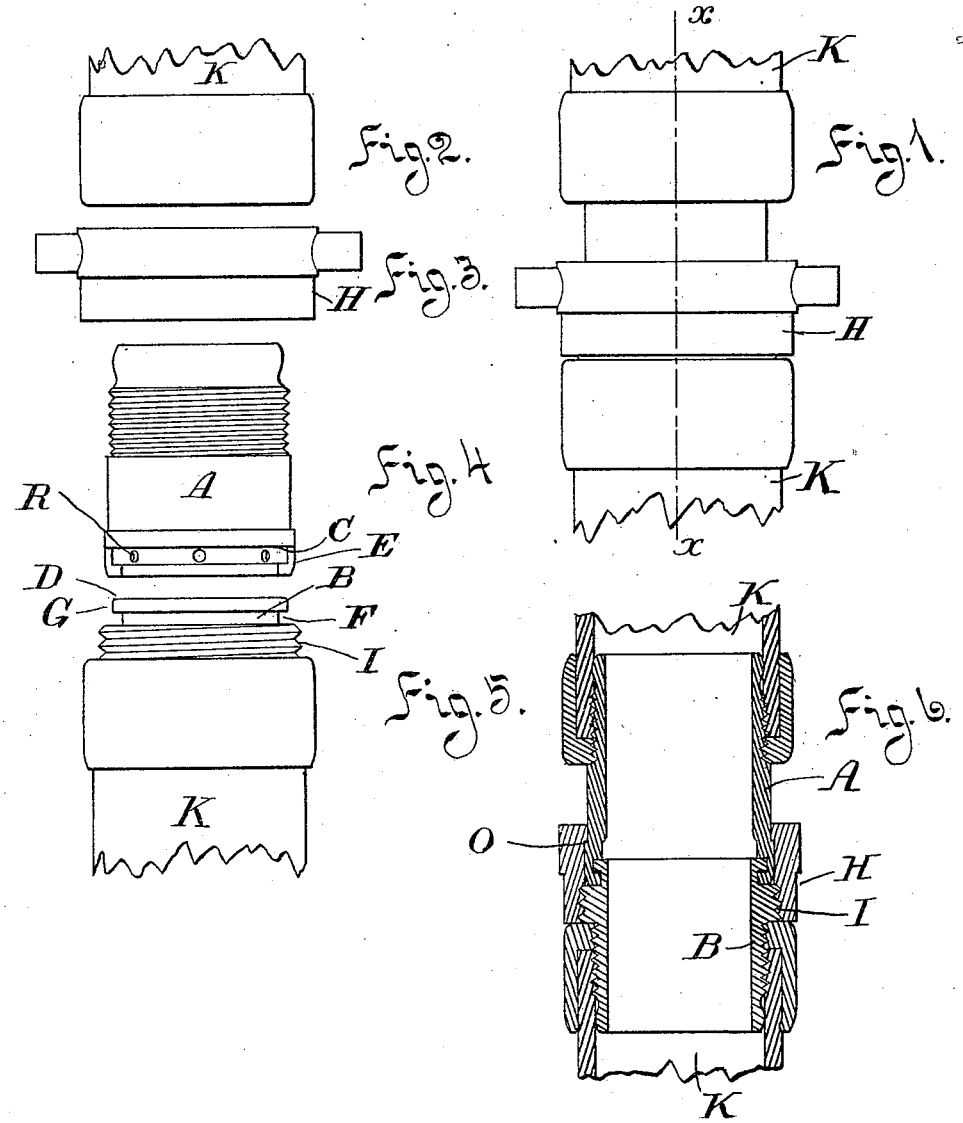
Witnesses:
Charles G. C. Simpson
W. F. Judge
Inventor.
Peter Lord

UNITED STATES PATENT OFFICE.

PETER LORD, OF MONTREAL, QUEBEC, CANADA, ASSIGNOR OF TWO-THIRDS TO EUSEBE MIGNAULT AND JEAN BAPTISTE VINET, OF SAME PLACE.

HOSE-COUPLING.

SPECIFICATION forming part of Letters Patent No. 248,658, dated October 25, 1881.

Application filed August 15, 1881. (No model.)

*To all whom it may concern:*

Be it known that I, PETER LORD, of the city and District of Montreal, Province of Quebec, Canada, have invented certain new and useful Improvements in Hose-Couplings; and I do hereby declare that the following is a full, clear, and exact description of the same.

This invention has reference to improvements in hose-couplings to render them capable of being connected and disconnected while under pressure, or, in other words, while a head or column of water is passing through one or both of them; it also renders them more easy of connection in case of having to couple them together in the dark, and it prevents the crossing of the threads of their screws when great haste is required.

In the drawings hereunto annexed similar letters of reference indicate like parts.

Figure 1 is an elevation of a hose-coupling completely connected embodying my invention. Figs. 2, 3, and 4 show one-half of the coupling separated into its respective parts. Fig. 5 shows the other half of the invention with the parts composing it put together. Fig. 6 is a section on line *x x*, Fig. 1.

Letters A and B are the bushes to be attached to the two ends of hose-pipes to be connected together. On the end surface of A, as indicated by C, and on the end surface of B, as indicated at D, a ground joint is formed, so that bringing the two together they are rendered water-tight without any packing, &c.

On the outside of the surface forming the joint, as above mentioned, on the bush A, a semicircular grooved flange, E, is formed, agreeing with a groove, F, and flange G on B, so that it is only necessary to bring the two together and place them in the position shown in Fig. 6, so that the grooved flange E not only serves as a hook to hook the two bushes together, but it also holds them in such relative position that the thread of the nut H will agree with the thread of the collar I on the bush B, and thereby prevent any danger of crossing the threads when screwing up the nut H on the collar I. The surfaces of the nut H and bush A at O (see Fig. 6) are also preferably got up to a ground joint, so that in case of damage to the surfaces of the ends of A and B the coupling may yet be tight.

It will be observed that the flange E is provided with holes R. These are to allow any water that might lodge in the groove to escape, as in winter-time it might freeze and retard the free uniting of the bushes.

Although the nut H is provided with projections for the ordinary wrench, yet as a usual thing no wrench will be required, as the nut H may be screwed up by hand; but for fear of jamming the projections are provided.

I do not claim any improvement in the manner of attaching the hose-pipes K to the bushes A and B.

What I claim, and wish to secure by Letters Patent is as follows:

1. The combination of the bush A, having flange E, and half C of joint, as described, with bush B, having groove F, and half D of joint, flange G, and collar I, and nut H, the whole constructed, arranged, and operated substantially as set forth.

2. The combination of the bush A, having flange E, as described, with bush B, having groove F, flange G, and collar I, and the nut H, having joint O formed on it and on the bush A, the whole constructed, arranged, and operated substantially as set forth.

PETER LORD.

Witnesses:
 CHARLES G. C. SIMPSON,
 W. E. FUDGER.